Patented Nov. 10, 1953

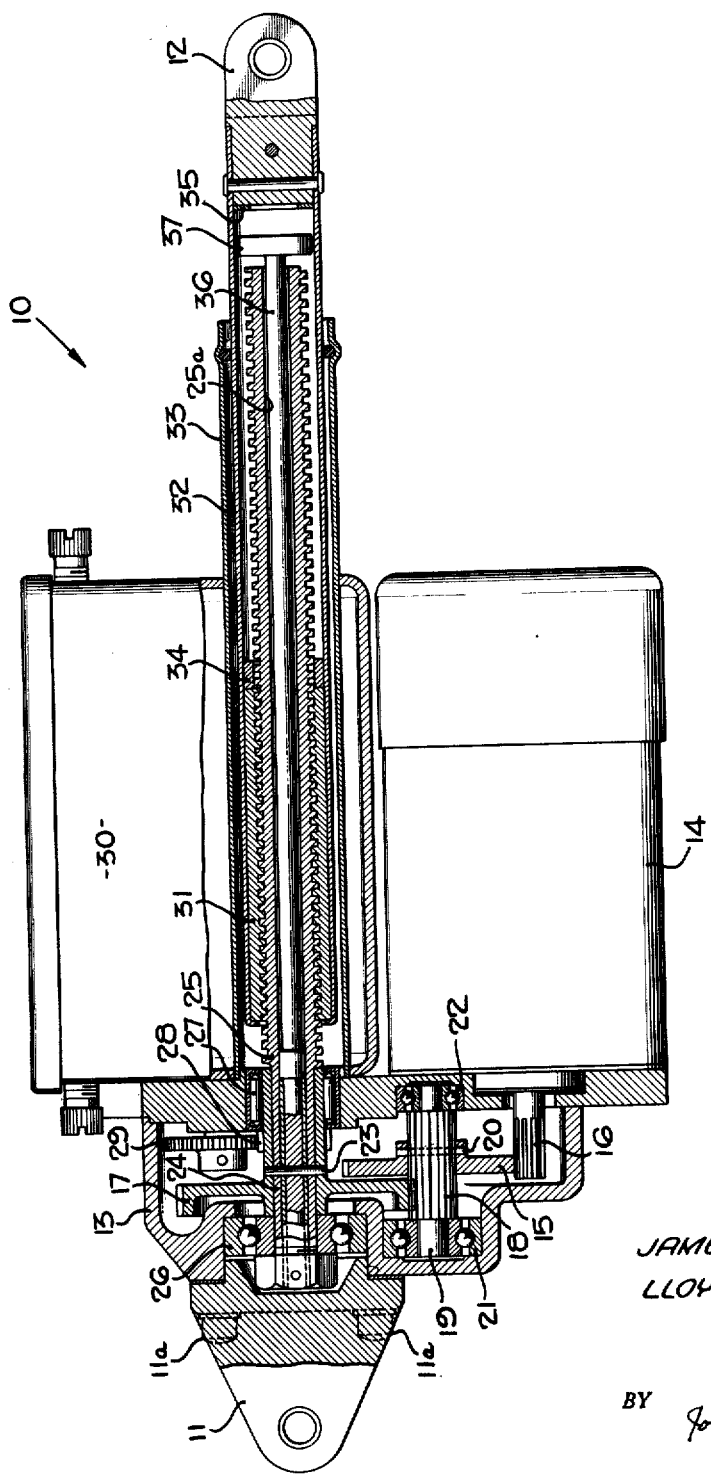

2,658,407

UNITED STATES PATENT OFFICE 2,658,407

NONJAMMING STOP FOR LINEAR ACTUATORS

James E. Chapman, Los Angeles, and Lloyd D. Bevan, Van Nuys, Calif., assignors to The Garrett Corporation, Los Angeles, Calif., a corporation of California Application June 3, 1949, Serial No. 97,054

12 Claims. (Cl. 74—424.8)

1

This invention pertains to extensible struts, and relates particularly to a means for reducing or eliminating a jam which may occur at either of the extreme limits of movement of such a strut.

Extensible struts of the electrically actuated type are extensively used in aircraft, for example, for the remote control of movable airfoil surfaces. In some applications of such linear actuators it has been found that binding or galling of the translatory member with respect to the stationary member occurs at either or both of the fully retracted and extended positions. As a consequence of such a jam, it is not unusual that the motor upon reversal is incapable of both reducing the jam and accelerating the load. The condition is aggravated by virtue of the fact that such a binding or galling jam occurs at surfaces which move relative to each other in both rotary and longitudinal movements. Hence when the members of the strut are extended or retracted to an extreme limit of movement a quantity of kinetic energy is dissipated as heat because of the jam at the surfaces of the moving parts.

It is an object of this invention to provide means for converting at least a part of the kinetic energy of a jam into potential energy available to assist in unjamming the parts. It is a further object to provide a novel stress member associated with one of the jamming members, wherein the greater portion of the jam kinetic energy is converted to and stored as the potential energy of a stress induced in the member in the form of torsional and/or longitudinal stress, the latter stress being either compressional or tensional.

Further objects will be apparent upon consideration of the preferred embodiment of the invention shown on the drawing and described in detail herein. Since many changes could be made in the preferred embodiment without departing from the scope of the invention, it is intended that all matter contained in the description and shown in the accompanying drawing shall be interpreted as being illustrative rather than as being restrictive of the scope of the invention.

The single figure of the drawing is a partially sectioned view of an extensible strut of the electrically actuated type.

The strut, generally indicated at 10, is adapted for pivotal mounting to members (not shown) for inducing relative movement therebetween by means of eye fittings 11 and 12, which are prevented from rotation about the axis of the strut

2 by virtue of their attachment to the aforementioned movable members. Fitting 11 is secured by means of screws 11a to a gear housing 13, within which a train of gears is disposed for transmitting power from an electric or other type of motor 14 to the relatively movable primary parts of the strut to be described. As shown, the gear train comprises a spur gear 15 driven by the pinion shaft 16 of motor 14, and a spur gear 17 driven by the pinion portion 18 of a countershaft 19 to which the gear 15 is secured, as by splining engagement therewith and by a pin 20. The countershaft 19 is rotatably contained within the housing 13 by means of anti-friction bearings 21 and 22.

The spur gear 17 is secured by means of a pin 23 to the reduced portion 24 of a jack screw shaft 25 which comprises one of the two relatively movable primary parts of the strut aforementioned. Anti-friction bearings 26 and 27 support the jackscrew shaft 25 for rotation within the housing 13 on either side of the spur gear 17. Between the gear 17 and bearing 27 a pinion gear 28 is secured to the shaft 25 and adapted to engage a gear 29 which may actuate an electric switching mechanism in the control box 30, the latter forming no part of the invention and hence not being described herein. Distal of the bearing 27 the shaft 25 is threaded to receive a cooperating nut 31 for translational movement thereof when the shaft is rotated, the nut 31 constituting the second of the aforementioned relatively movable primary parts of the strut. A thrust sleeve 32, to the outer end of which the eye fitting 12 is secured, is attached at its inner end to the nut 31 by any preferred means, such as dimpling or brazing. Secured to the housing 13, and overlying the thrust sleeve 32 is a dust tube 33 within which the sleeve 32 is adapted to move axially.

Attached to the end of nut 31 in any convenient manner is a stress collar 34, preferably of steel, whose purpose will be hereinafter described. A stress washer 35, likewise preferably fabricated of steel, may be brazed or otherwise affixed to the inner end of fitting 12 if desired.

The jackscrew shaft 25 has an axial bore 25a throughout its length and has therewithin a stress rod member 36, of a slightly smaller diameter than the shaft bore, and anchored therewithin at its leftward end by suitable means, such as brazing. An enlarged head 37 on the rightward end of the member 36 is of slightly smaller diameter than the inside diameter of the thrust sleeve 32, whereby it is adapted to contact the stress collar 34 when the strut is in extended position and to contact the stress washer 35 when the strut is retracted.

It is now apparent that extension of the strut to its extreme limit causes the nut 31 to traverse the threads of shaft 25 until the collar 34 contacts the enlarged portion 37 of the member 36, at which time a tendency towards further strut extension will result in (a) tension stress in member 36 by virtue of the linear motion of the nut 31 with respect to shaft 25 and (b) torsion stress in member 36 by virtue of rotary motion of the shaft 25 (and thus of the member 36 and its enlarged head 37) with respect to nut 31.

Likewise it is apparent that retraction of the strut to its other extreme limit causes the nut 31 to traverse the threads of shaft 25 until the washer 35 contacts the opposite face of the enlarged head 37 of the member 36, at which time a tendency toward further strut retraction will result in (a) compression stress, and (b) torsion stress, in member 36.

In either event, the moving parts come to rest in non-jam association, since the kinetic energy of the usual jam is now stored as potential energy in the resilience of the stress rod member 36 and is employed to augment the starting torque applied by the motor when reverse movement is to be effected.

We claim:

1. A non-jamming stop for members movable rotatively and translationally of each other to one limit of movement thereof, comprising: a first stress member secured to one of said movable members; a second stress member secured to the other of said movable members; friction surfaces on said stress members, at least one of said stress members being adapted to convert at least a portion of the kinetic energy of a jam to the potential energy of a longitudinal and torsional stress in one of said stress members upon frictional engagement of said surfaces; and means for imparting rotative movement to one of said movable members.

2. The invention of claim 1 further characterized in that the potential energy-storing stress member is secured to the rotative one of said movable members.

3. A non-jamming stop for members movable rotatively and translationally of each other between limits of movement thereof, comprising: a first stress member secured to one of said movable members; a second stress member secured to the other one of said movable members; a third stress member likewise secured to the said other one of said movable members; friction surfaces on said stress members, said second and third stress members being secured in such manner that said second stress member frictionally engages said first stress member by means of said friction surfaces adjacent one limit of movement of said movable members, and said third stress member frictionally engages said first stress member by means of said friction surfaces adjacent the other limit of movement of said movable members whereby at least one of said stress members converts at least a portion of the kinetic energy of a jam to the potential energy of a longitudinal and torsional stress in one of said stress members upon frictional engagement; and means for imparting rotative movement to one of said movable members.

4. The invention of claim 3 further characterized in that said first stress member is the potential energy storing member.

5. The invention of claim 4 further characterized in that said first stress member is secured to the rotative one of said movable members.

6. An extensible strut for the movement of one part relative to another part to one limit of movement therebetween, comprising: a housing; means connecting said housing with one of said parts; a first movable member in said housing; a second movable member in threaded screw relation to said first movable member; means connecting said second movable member with the other of said parts; means associated with one of said movable members for imparting rotative movement thereto; a first stress member secured to one of said movable members; a second stress member secured to the other of said movable members; and friction surfaces on said stress members, at least one of said stress members being adapted to convert at least a portion of the kinetic energy of a jam to the potential energy of a longitudinal and a torsional stress in one of said stress members upon frictional engagement of said surfaces.

7. The invention of claim 6 further characterized in that the potential energy storing stress member is secured to the rotative one of said movable members.

8. An extensible strut for the movement of one part relative to another part between limits of movement thereof, comprising: a housing; means connecting said housing with one of said parts; a first movable member in said housing; a second movable member in threaded screw relation to said first movable member; means connecting said second movable member with the other of said parts; means associated with one of said movable members for imparting rotative movement thereto; a first stress member secured to one of said movable members; a second stress member secured to the other one of said movable members; a third stress member likewise secured to said other one of said movable members; and friction surfaces on said stress members, said second and third stress members being secured in such manner that said second stress member frictionally engages said first stress member by means of said friction surfaces at one limit of movement of said movable members, and said third stress member frictionally engages said first stress member by means of said friction surfaces at the other limit of movement of said movable members whereby at least one of said stress members converts at least a portion of the kinetic energy of a jam to the potential energy of a longitudinal and torsional stress in said one of said stress members upon frictional engagement of said surfaces.

9. The invention of claim 8 further characterized in that said first stress member is the potential energy storing member.

10. The invention of claim 9 further characterized in that said first stress member is secured to the rotative one of said movable members.

11. An actuator comprising members movable relative to each other to a limit of movement, a torsion stress member connected with one of said members and having a surface frictionally engaging a surface on the other of said members at the region of said limit of movement, said stress member being torsionally stressed after engagement of said surfaces at said limit of movement.

12. A gearing comprising screw and nut members movable relative to one another, said members having portions limiting said relative movement, one of said portions comprising a torsion stress means having a friction surface, the other of said portions also including a friction surface arranged to slidably engage the first friction surface at the limit of movement of the nut member relative to the screw member, said stress means becoming stressed after said surfaces are engaged.

JAMES E. CHAPMAN.
LLOYD D. BEVAN.

References Cited in the file of this patent

UNITED STATES PATENTS

| Number | Name | Date |
|---|---|---|
| 2,182,584 | Fitz Gerald | Dec. 5, 1939 |
| 2,407,537 | Chapman | Sept. 10, 1946 |
| 2,410,695 | Werner | Nov. 5, 1946 |
| 2,422,905 | Jackson | June 24, 1947 |
| 2,482,568 | Werner | Sept. 20, 1949 |
| 2,590,251 | Hoover | Mar. 25, 1952 |